United States Patent [19]
Cox

[11] 4,447,402
[45] May 8, 1984

[54] AUTOCLAVES

[75] Inventor: G. Robert Cox, Pittsburgh, Pa.

[73] Assignee: Devine Manufacturing Company, Pittsburgh, Pa.

[21] Appl. No.: 382,598

[22] Filed: May 27, 1982

[51] Int. Cl.³ .............................................. B01J 3/04
[52] U.S. Cl. ................................... 422/174; 219/354; 219/404; 219/411; 422/199; 422/202
[58] Field of Search ............... 422/174, 199, 307, 202; 219/354, 404, 411, 405, 389

[56] References Cited

U.S. PATENT DOCUMENTS

| | | | |
|---|---|---|---|
| 2,263,866 | 11/1941 | Barber | 219/354 X |
| 2,615,116 | 10/1952 | Hayes et al. | 219/388 |
| 2,820,131 | 1/1958 | Kodama | 219/388 |
| 4,228,134 | 10/1980 | Alfio | 422/307 X |

FOREIGN PATENT DOCUMENTS 56-24928 3/1981 Japan .................................. 422/199

Primary Examiner—Robert L. Lindsay, Jr.
Attorney, Agent, or Firm—Buell, Blenko, Ziesenheim & Beck

[57] ABSTRACT

The disclosed invention pertains to an autoclave apparatus for receiving parts to be bonded or cured which includes a removable cover on the end of a pressure vessel having radiant heat means that directs heat directly onto the surface of a product to effect a bonding or curing temperature without substantially heating the pressure vessel and its parts.

15 Claims, 5 Drawing Figures

AUTOCLAVES

This invention relates to autoclaves and particularly to bonding and/or curing utoclaves.

Autoclaves have long been used for heating metal parts to be bonded and/or to cure advanced composite shapes or other parts being processed. The present method and apparatus for accomplishing this is to have a heat source located at one end of the autoclave over which a stream of air or gas is passed and heated. The heated air or gas then passes over the parts which are thereby heated at the desired rate to the desired temperature. With this method, however, the pressurized air in the autoclave as well as the exposed metal parts of the autoclave interior must also be heated. When cooling the autoclave prior to removing the product, these autoclave parts must also be cooled at the rate of cooling specified for the product parts. This of course uses excessive amounts of energy in heating and cooling as well as lost time.

I have discovered that, by using uniform or contoured radiant heaters with proper controls, the product part can be heated in the autoclave to the specified temperature and at the specified rate for this product in still (non-moving) air or gas with substantially all of the heat going into the product parts. I have thereby eliminated the heat presently lost to autoclave parts and heat loss through the autoclave wall, both of which can be substantial.

I have found that my invention can be practiced by using electric powered radiant heaters in a pressure curing/bonding autoclave arranged to direct their heat output onto the product parts to be treated. Alternatively, I may use electric powered radiant heaters in such autoclave but with an adjustable mounting for the radiant heaters so that they may be positioned to give even heating to non-uniform parts, or with means to raise and lower the entire heating system within the autoclave so as to alter the average heat gradient at the level of the product parts or I may use specially contoured radiant heat sources to match cylindrical and odd shaped product pieces.

The autoclave apparatus of this invention generally comprises a pressure vessel receiving parts to be bonded and/or cured, a removable cover on one end of said pressure vessel providing access thereto, means in said vessel for holding a product to be bonded and/or cured in fixed position, means for providing a desired pressure level of gas in said vessel, which may be negative or positive relative to atmosphere, and radiant heat means in the vessel directing bonding and/or curing heat directly onto the surface of the product at a rate sufficient to heat the product to the desired bonding and/or curing temperature without substantially heating the pressure vessel and its parts. Preferably the radiant heat means is electric powered. The radiant heat means is preferably adjustably mounted in the pressure vessel so that it may be moved relatively to the product being heated so as to permit uniform heating of non-uniform parts. Means are preferably provided within the pressure vessel for moving and adjusting the radiant heat means so as to alter and/or control the average heat gradient at the product surfaces being heated. The radiant heat means may be contoured to match the contours of the surfaces of the product being heated and may be made up of a plurality of elements, which may be individually contoured, adjustably mounted on a main frame, which itself may be adjustable in the pressure vessel. Preferably, the vessel is provided with a reflecting cylinder concentric with and spaced from the vessel body and surrounding the heaters, the product and the product support.

In the foregoing general description of this invention, certain objects, purposes and advantages have been set out. Other objects, purposes and advantages of the invention will be apparent from a consideration of the following description and the accompanying drawings in which.

Figure 1:
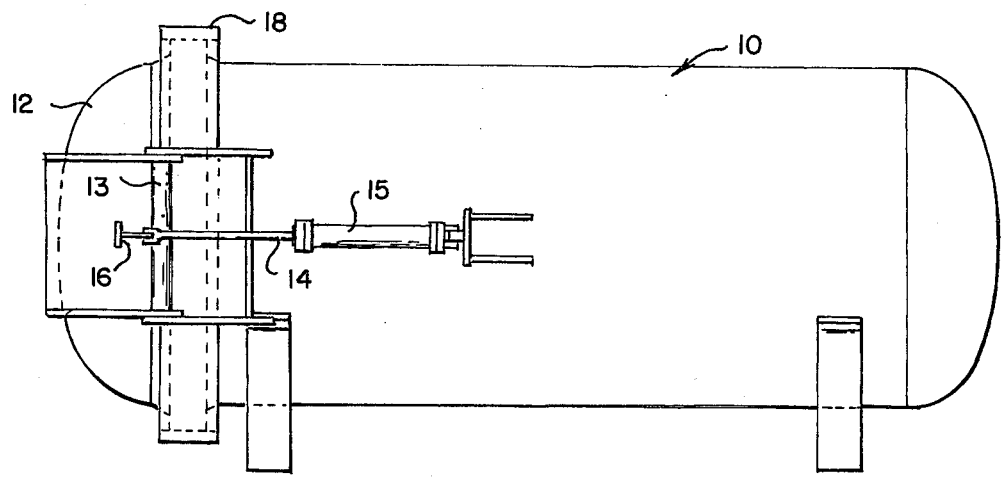
FIG. 1 is a side elevation of an autoclave according to this invention.
Figure 2:
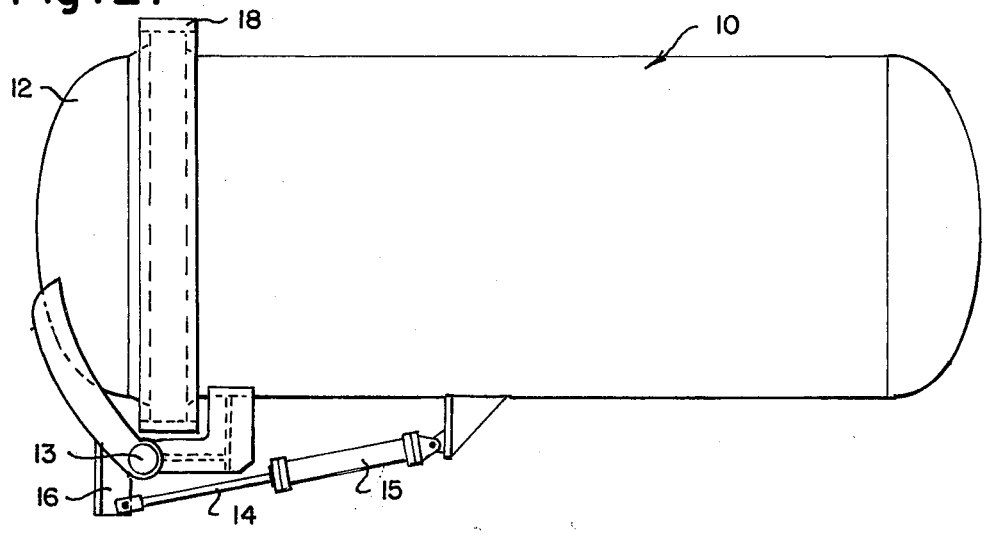
FIG. 2 is a top plane view of the autoclave of FIG. 1.
Figure 3:
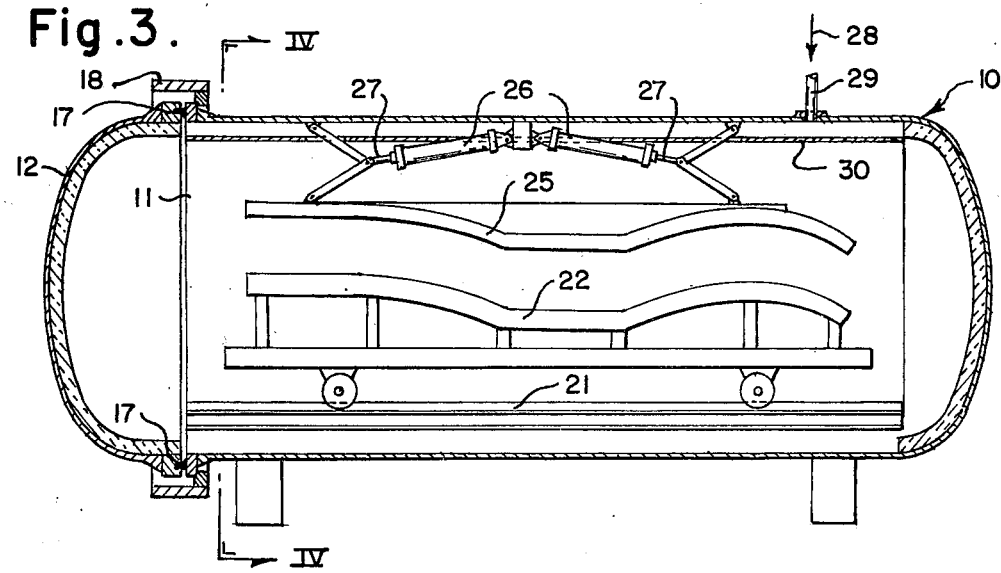
FIG. 3 is a longitudinal cross section through an autoclave according to this invention.

Referring to the drawings I have illustrated an autoclave pressure vessel 10 of elongate cylindrical form having an opening 11 at one end closed by a door 12 hinged at one side 13 of opening 11 and actuated to open and closed position by hydraulic piston 14 and cylinder 15 connected between the sidewall of vessel 10 and arm 16 on door 12. The door 12 is sealed to vessel 10 and opening 11 by a lip gasket 17 and by an outer lock ring 18 which is rotated between open and locked position by hydraulic cylinders (not shown) in convention manner. All of the foregoing is conventional autoclave structure. A trackway 21 extends longitudinally of the bottom of vessel 10 and carries a support jig 22 on wheels designed to carry and support the part of parts to be heated and/or cured into the interior of the autoclave. A radiant heat unit 25 is suspended from the top interior of autoclave vessel 10 on hydraulic cylinders 26 and pistons 27 designed to permit the heat unit 25 to be raised and lowered in the autoclave relatively to the work product supported on jig 22. Preferably, the heat unit 25 is contoured to the shape of the work product surface being heated. A source of pressure gas 28 is connected by pipe 29 to pressure vessel 10.

Figure 4:
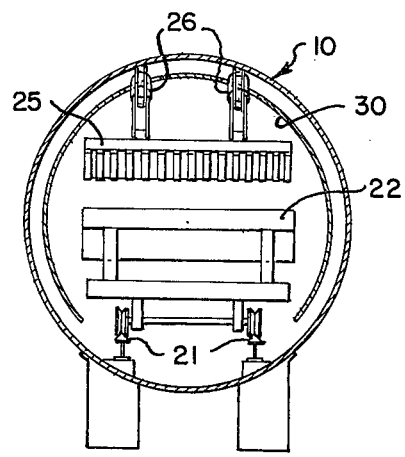
FIG. 4 is a transverse section on the line IV-IV of FIG. 3.
Figure 5:
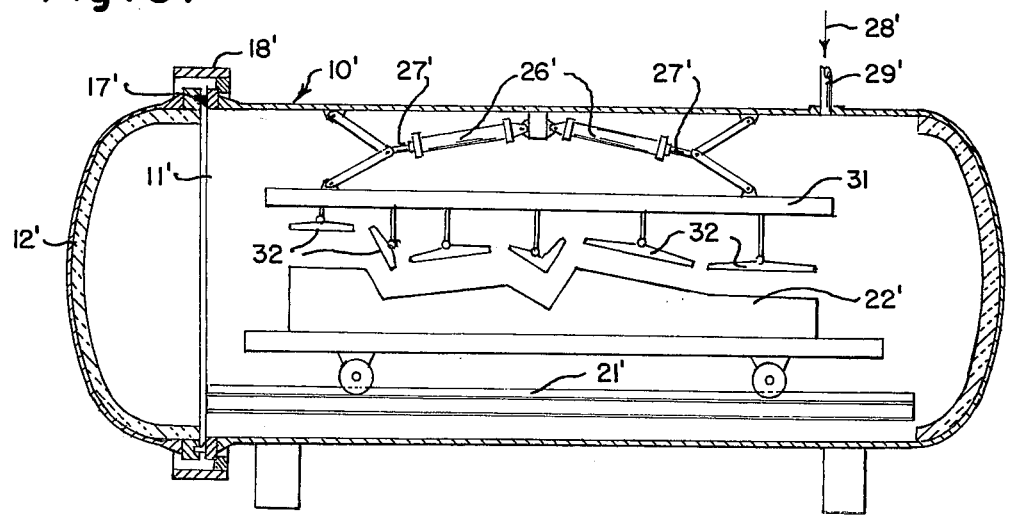
FIG. 5 is a longitudinal section through a second embodiment of autoclave according to this invention.

In the apparatus disclosed in FIG. 5 I have illustrated an autoclave identical to that of FIGS. 1 and 4 with like parts bearing like numbers with a prime sign. In the apparatus of FIG. 5, however, I provide a main frame 30 suspended from the top interior of autoclave vessel 10' on hydraulic cylinders 26' and pistons 27' designed to raise and lower the main frame 31 relatively to a work piece supported on jig 22'. A plurality of separate heat units 32 are universally mounted for movement on frame 31 for adjustment thereon to permit the elements to be selectively positioned to provide even heating to the surfaces of non-uniform parts.

A reflecting cylinder 30 may be fixed within vessel 10, concentric therewith and spaced therefrom to provide an annular passage to circulate air or cooling gas. The heat unit 25, jig 22 and part to be heated are surrounded by the reflecting cylinder.

In the foregoing specification I have set out certain preferred practices and embodiments of my invention, however, it will be understood that this invention may be otherwise embodied within the scope of the following claims.

I claim:

1. An autoclave apparatus for raising the temperature of metal and like parts to be bonded and/or cured comprising a pressure vessel receiving parts to be bonded and/or cured, a removable cover on one end of said pressure vessel providing access thereto, means in said vessel for holding a product to be bonded and/or cured in fixed position, means for providing a pressure gas in said vessel at a selected pressure level and radiant heat means in the vessel directing bonding and/or curing heat directly onto the surface of the product at a rate sufficient to heat the product to the desired bonding and/or curing temperature without substantially heating the pressure vessel and its parts.

2. An autoclave apparatus as claimed in claim 1 wherein the radiant heat means is electric powered.

3. An autoclave apparatus as claimed in claim 1 or 2 wherein the radiant heat means is adjustably mounted in the pressure vessel to provide uniform heat distribution to non-uniform parts.

4. An autoclave apparatus as claimed in claim 1 or 2 wherein the radiant heat means is contoured to match the contours of the surfaces of the product to be heated.

5. An autoclave apparatus as claimed in claim 1 or 2 wherein means are provided in the pressure vessel acting on the radiant heat means to raise and lower the same relatively to the surfaces of the product being heated whereby to alter the avarage heat gradient at the surfaces being heated.

6. An autoclave apparatus as claimed in claim 1 or 2 wherein the radiant heat means is made up of a plurality of heat units each of which is adjustably mounted in the pressure vessel whereby they may be separately positioned to provide substantially uniform heating to the surfaces of non-uniform parts.

7. An autoclave apparatus as claimed in claim 1 or 2 wherein the radiant heat means includes a main frame, means in the pressure vessel for raising and lowering said main frame to alter the average heat gradient at the level of the product surfaces, a plurality of separate radiant heat elements on said main frame and adjusting means connecting each said heat element to said frame whereby said elements may be positioned relatively to said main frame to provide even heating to the surfaces of non-uniform parts.

8. An autoclave apparatus as claimed in claim 7 wherein the separate heat elements are contoured to match the surfaces of odd shaped and non-uniform parts.

9. An autoclave apparatus as claimed in claim 1 or 2 wherein a concentric reflecting cylinder spaced from the pressure vessel is fixed in said pressure vessel around the radiant heat means and means for holding a product.

10. An autoclave apparatus as claimed in claim 3 wherein a concentric reflecting cylinder spaced from the pressure vessel is fixed in said pressure vessel around the radiant heat means and means for holding a product.

11. An autoclave apparatus as claimed in claim 4 wherein a concentric reflecting cylinder spaced from the pressure vessel is fixed in said pressure vessel around the radiant heat means and means for holding a product.

12. An autoclave apparatus as claimed in claim 5 wherein a concentric reflecting cylinder spaced from the pressure vessel is fixed in said pressure vessel around the radiant heat means and means for holding a product.

13. An autoclave apparatus as claimed in claim 6 wherein a concentric reflecting cylinder spaced from the pressure vessel is fixed in said pressure vessel around the radiant heat means and means for holding a product.

14. An autoclave apparatus as claimed in claim 7 wherein a concentric reflecting cylinder spaced from the pressure vessel is fixed in said pressure vessel around the radiant heat means and means for holding a product.

15. An autoclave apparatus as claimed in claim 8 wherein a concentric reflecting cylinder spaced from the pressure vessel is fixed in said pressure vessel around the radiant heat means and means for holding a product.

* * * * *